(12) United States Patent
Haas (10) Patent No.: US 8,230,794 B1
(45) Date of Patent: Jul. 31, 2012

(54) HOLDING SYSTEM AND METHOD FOR A WORKBENCH

(76) Inventor: James Haas, Bridgewater, NJ (US)

( * ) Notice: Subject to any disclaimer, the term of this patent is extended or adjusted under 35 U.S.C. 154(b) by 841 days.

(21) Appl. No.: 12/358,644

(22) Filed: Jan. 23, 2009

Related U.S. Application Data (63) Continuation-in-part of application No. 10/772,662, filed on Feb. 5, 2004, now abandoned.

(51) Int. Cl.
*A47B 13/00* (2006.01)
(52) U.S. Cl. ............... 108/153.1; 108/180; 403/348
(58) Field of Classification Search ............ 108/153.1, 108/157.3, 180, 181, 190, 192, 193; 403/348, 403/353; 312/110, 111; 411/457, 442, 443, 411/444
See application file for complete search history.

(56) References Cited

U.S. PATENT DOCUMENTS

| | | | |
|---|---|---|---|
| 226,453 A | 4/1880 | Kelly | |
| 2,033,039 A | 3/1936 | Limpert | |
| 2,205,550 A | 6/1940 | Wehr | |
| 2,354,810 A | 8/1944 | Haas et al. | |
| 2,407,879 A | 9/1946 | Haas | |
| 2,668,304 A | 2/1954 | Murray | |
| 2,809,067 A | 10/1957 | Macchi | |
| 3,176,979 A | 4/1965 | Englemann | |
| 3,222,744 A | 12/1965 | Dellith | |
| 3,386,763 A | 6/1968 | Ottoway et al. | |
| 3,634,178 A | 1/1972 | Goodman | |
| 3,813,094 A | 5/1974 | Walton et al. | |
| 3,849,839 A | 11/1974 | Zimber | |
| 3,964,364 A | 6/1976 | Poe | |
| 4,003,549 A | 1/1977 | Sergerie | |
| 4,007,516 A | 2/1977 | Coules | |
| 4,009,786 A | 3/1977 | Littlewood | |
| 4,165,811 A | 8/1979 | Mainvielle | |
| 4,308,646 A | 1/1982 | Schenk | |
| 4,338,836 A | 7/1982 | Kuchler | |
| 4,474,489 A | 10/1984 | Simon | |
| 4,498,827 A | 2/1985 | Mair | |
| 4,505,468 A | 3/1985 | Heisler | |
| 4,518,277 A | 5/1985 | Bush et al. | |
| 4,526,363 A | 7/1985 | Fort | |
| 4,532,622 A | 7/1985 | Newbold | |
| 4,605,216 A | 8/1986 | DeWitt et al. | |
| 4,641,826 A | 2/1987 | van der Weide | |
| 4,645,193 A | 2/1987 | Walton et al. | |
| 4,705,442 A | 11/1987 | Fucci | |
| 4,711,596 A | 12/1987 | Bruderer | |

(Continued)

*Primary Examiner* — Jose V Chen
(74) *Attorney, Agent, or Firm* — Thomas L. Adams (57) ABSTRACT

A workbench is equipped with a clamping device that has a moveable element. A holding system has a top with a fibrous or pierceable material that is disposed upon the workbench near the clamping device. The system employs at least one block having a working face and a connecting face. The working face is adapted to oppose the moveable element. The block has on its connecting face at least one connector for securing the block in place on the top against clamping forces from the clamping device. The connector includes a first hub and a second hub, each having on one side thereof a plurality of spiral prongs. The spiral prongs on the first hub spiral in a direction opposite that of the spiral prongs on the second hub. The connector also has a manually operable link connected between the hubs for relatively rotating them in opposite directions in order to releasably connect to the fibrous or pierceable material of the top. A workpiece is placed between the block and the moveable element. The clamping device is operated to clamp the workpiece between the moveable element and the block.

20 Claims, 4 Drawing Sheets

U.S. PATENT DOCUMENTS

| | | |
|---|---|---|
| 4,761,027 A | 8/1988 | Gehrig |
| 5,007,616 A | 4/1991 | Scarpino |
| 5,133,617 A | 7/1992 | Sokn et al. |
| D367,438 S | 2/1996 | Schriever |
| 5,496,021 A | 3/1996 | Bellio et al. |
| D374,609 S | 10/1996 | Akeno |
| 5,624,110 A | 4/1997 | Fyler |
| 5,624,167 A | 4/1997 | Katz |
| 5,651,570 A | 7/1997 | Schrum et al. |
| 5,728,116 A | 3/1998 | Rosenman |
| 5,873,379 A | 2/1999 | Bouix |
| 5,899,621 A | 5/1999 | Wang |
| 6,123,035 A * | 9/2000 | Pfister .......................... 108/180 |
| 6,296,656 B1 | 10/2001 | Bolduc et al. |
| 6,336,766 B1 | 1/2002 | De Villele |
| 6,468,309 B1 | 10/2002 | Lieberman |
| 6,494,657 B2 | 12/2002 | Unsworth et al. |
| 6,520,464 B1 | 2/2003 | Morrissey et al. |
| 6,616,369 B2 | 9/2003 | Clark |
| 6,726,421 B2 | 4/2004 | Giannakakos et al. |
| 6,726,422 B2 | 4/2004 | Giannakakos et al. |
| 7,100,854 B2 | 9/2006 | Aby-Eva et al. |
| 2004/0069980 A1 | 4/2004 | Shannon |

\* cited by examiner

HOLDING SYSTEM AND METHOD FOR A WORKBENCH

CROSS-REFERENCES TO RELATED APPLICATIONS

This application claims the benefit of U.S. patent application Ser. No. 10/772,662, filed Feb. 5, 2004, the contents of which are hereby incorporated by reference herein.

BACKGROUND OF THE INVENTION

1. Field of the Invention

The present invention relates to workpiece holding systems, and in particular, to systems cooperating with workbenches.

2. Description of Related Art

Workpieces are often held in a fixed position on a platform or workbench when being machined or milled. A workpiece may be held in a machinist's vise between two heavy steel jaws that can be brought together by a manually operable screw.

Woodworking vises may have a wooden block that is mounted on rails on the front or the end of a workbench. A hand operated screw can bring the block inward to clamp a workpiece to an edge of the workbench. In some cases the vise will have in addition a stationary block so that the moveable block can be driven toward the stationary block on the edge of a workbench.

Often a workpiece is larger than the maximum opening of a vise on a workbench. In that case the workbench can have a series of holes for holding one or more dogs, typically pegs that face the vise.

If the vise has a moveable jaw that rises above the topside of the workbench, this jaw can push a workpiece against the dog or dogs. In some cases the top of the moveable jaw is coplanar with the topside of the workbench in which case one or more dog-like fixtures can be attached to the top the moveable jaw. Accordingly, a workpiece can be clamped between these fixtures and dogs on the workbench by moving the moveable jaw inward toward the dogs on the workbench.

The bench dogs can be placed in only the limited number of holes formed in the workbench. In some cases the dog's position is inconvenient and the workpiece may be too long or short relative to the dog. In still other cases the edge of the workpiece facing the dogs may be irregular but the dogs would be unable to provide the finely adjusted backstop needed to firmly and securely engage the irregular workpiece. While shims or spacers can be used to accommodate the irregularities, these require careful machining and will lengthen the time needed to perform the simple task of clamping.

See also U.S. Patent Application Publication No. 2004/0069980 and the following U.S. Patents: D367,438; D374,609; 226,453; U.S. Pat. Nos. 2,033,039; 2,205,550; 2,354,810; 2,407,879; 2,668,304; 2,809,067; 3,176,979; 3,222,744; 3,386,763; 3,634,178; 3,813,094; 3,849,839; 3,964,364; 4,003,549; 4,009,786 4,007,516; 4,165,811; 4,308,646; 4,338,836; 4,498,827; 4,505,468; 4,518,277; 4,526,363; 4,605,216; 4,641,826; 4,645,193; 4,705,442; 4,761,027; 5,007,616; 5,496,021; 5,624,110; 5,624,167; 5,728,116; 6,296,656; 6,468,309; 6,494,657; 6,520,464; 4,474,489; 4,532,622; 4,711,596; 5,133,617; 5,651,570; 5,873,379; 5,899,621; 6,123,035; 6,336,766; 6,616,369; 6,726,421; 6,726,422; and 7,100,854.

SUMMARY OF THE INVENTION

In accordance with the illustrative embodiments demonstrating features and advantages of the present invention, there is provided a holding system for a workbench equipped with a clamping device having a moveable element. The holding system includes a top adapted to be disposed upon the workbench proximate the clamping device. The top has a fibrous or pierceable material. The holding system also includes at least one block having a working face and a connecting face. The working face is adapted to oppose the moveable element. The block has on its connecting face at least one connector for securing the block in place on the top against clamping forces from the clamping device. The connector includes a first hub and a second hub. Each of the hubs has on one side thereof a plurality of spiral prongs. The spiral prongs on the first hub spiral in a direction opposite that of the spiral prongs on the second hub. The connector also has a manually operable link connected between the first and the second hub for relatively rotating them in opposite directions in order to releasably connect to the fibrous or pierceable material of the top.

In accordance with another aspect of the invention a clamping method is provided applying one or more blocks having an underlying connector to a workbench equipped with a fibrous or pierceable material on top as well as being equipped with a clamping device having a moveable element. This connector includes concentrically nested hubs with oppositely spiraling prongs. The method includes the step of adjoining the connector of the block to the fibrous or pierceable material. Another step is counter-rotating the hubs in the connector to embed their spiral prongs in the fibrous or pierceable material atop the workbench. The method also includes the step of placing a workpiece between the block and the moveable element. Also included is the step of operating the clamping device to clamp the workpiece between the moveable element and the block.

In accordance with yet another aspect of the invention there is provided a workbench including a frame with a platform. Also included is a clamping device mounted to the frame and having a moveable element. The workbench includes a top mounted on the platform proximate the clamping device. The top includes a fibrous or pierceable material at least partially covering the platform. The workbench has a plurality of blocks each having a working face and a connecting face. This working face is adapted to oppose the moveable element. The blocks each have on its connecting face at least one connector for concurrently securing the plurality of blocks in place on the top against clamping forces from the clamping device. For at least one of the blocks, the at least one connector is two in number with one being mounted on the connecting face and the other being mounted elsewhere. The connector includes a first hub and a second hub. The first hub is rotatably mounted to the connecting face of the corresponding one of the blocks. The second hub is annular. The first hub has a circular outline and is concentrically and rotatably mounted in the second hub. Each of the hubs has on one side thereof a plurality of spiral prongs arranged in at least one circular row. The spiral prongs on the first hub spiral in a direction opposite that of the spiral prongs on the second hub to provide a right and a left hand thread. Each of the spiral prongs rise less than its overall exposed length. The connector also has a manually operable lever connected between the first and the second hub and extending outside them for relatively rotating them in opposite directions, at most ⅟₁₆ of a turn in order to releasably connect to the fibrous or pierceable material of the top.

By employing apparatus and methods of the foregoing type, an improved holding or clamping technique is achieved. In one embodiment a top with a fibrous material or other penetrable material is secured upon a workbench.

The blocks disclosed herein have some of their faces fitted with connectors designed to attached to the top. Each of these connectors has a central hub concentrically and rotatably mounted inside an annular hub. Both hubs can rotate relative to each other and to the block. Both hubs support outwardly projecting spiral prongs. The prongs on one hub spiral in the opposite direction of the prongs on the other hub.

The spiral prongs on the hubs may be considered helical, with one set presenting a right handed thread and the other a left handed thread. These prongs may be relatively short and in many embodiments will be less than 1/16 of a turn, although the turning angle will vary with the size of the hub holding the prong.

Because of their relative shortness, the manufacturing of the prongs can be simplified. Specifically, the prongs may be made to follow the arc of a circle, that is, each prong may lie along a plane and need not follow the three dimensional path of a true helix. In a disclosed embodiment, each prong lies in a relatively shallow plane, for example, a plane with an angle of elevation of about 30°.

The two hubs are rotated relative to each other in the disclosed embodiment by manually operating a link. The link may be a lever that is pivotally connected to both hubs. The lever extends outwardly beyond the annular hub to allow a user to swing the lever.

A connector designed in this manner can be very easily operated. A user need only place a block's connector on the top that is disposed upon the workbench. Then the user will operate the link lever to relatively rotate the two hubs and their prongs. The two sets of prongs spiral in opposite directions into the penetrable material of the top.

These blocks can be arranged strategically on the workbench's penetrable top at positions facing the movable element of a vise or other clamping device. A disclosed vise has a movable jaw whose top is coplanar with the upper surface of the workbench. The top of this movable jaw is fitted with one or more fixtures and one edge of a workpiece is placed against these fixtures. The opposite edge of the workpiece lies on the penetrable top that is disposed upon the workbench. Along this opposite edge one or more blocks are placed with their connectors adjoining the penetrable top. The position of the blocks can be finely adjusted since their positioning does not rely on the existence of a dog hole. Moreover, the blocks can be adjusted to accommodate irregularities in the workpiece.

After the connectors are secured to the penetrable top as described above, the movable jaw can be moved inwardly to press the workpiece against the blocks. Thereafter, the workpiece will remain in place as it is drilled, planed, abraded, or otherwise machined or finished.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION OF THE PREFERRED EMBODIMENTS

Figure 1:
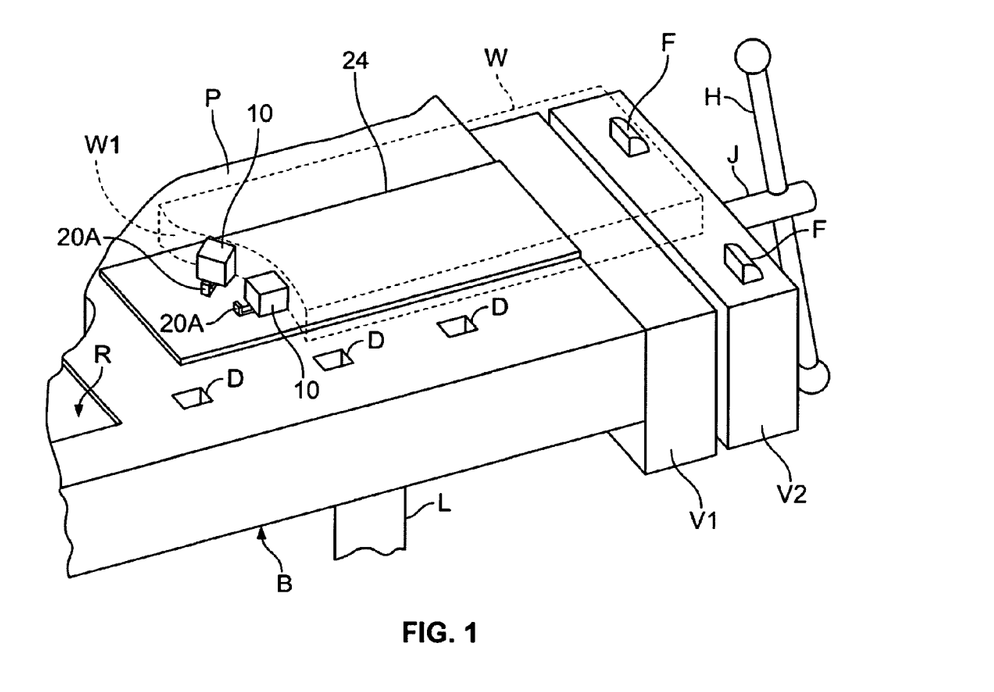
FIG. 1 is a perspective view of a holding system for a workbench in accordance with principles of the present invention.

Referring to FIG. 1, workbench B may have a platform P made of wood, metal, composites, laminated panels, etc. Platform P may be supported on a conventional frame L comprising legs, braces, spanners, and the like. The area on the topside of the platform P may be designed in accordance with the anticipated size of workpieces, the space available, etc.

Workbench B has a clamping device in the form of an end vise with stationary jaw element V1 and moveable jaw element V2 interconnected by slider rails (not shown). Jaw V2 may be moved toward (or away from) jaw V1 by rotating screw J with handle H. The tops of jaws V1 and V2 are coplanar with the topside of platform P. In some cases a similar vise may be installed along the front edge of bench B.

A series of dog holes D are shown in workbench B. Three are visible and in most embodiments additional holes will be placed in a variety of positions. Holes D are designed to hold dogs (not shown), namely, square pegs that leave exposed an upper stub with a flat facing the vise V1/V2. An inside end of a workpiece may be placed against such a dog or dogs, while the outside end of the workpiece can be placed against fixtures F that are removably mounted on the top of movable jaw V2. By rotating screw J with handle H, fixtures F on movable jaw V2 can press a workpiece against the dogs.

In this embodiment the topside of platform P is fitted with a top 24 that includes a fibrous or penetrable material. In some embodiments material 24 will be a section of loop pile carpeting installed near the vise V1/V2. The material of top 24 may be held in place by cement, tacks, staples, or other fastening means. In this embodiment, material 24 is folded over the edge of platform P and stationary jaw V1 will be attached over this fold to hold material 24 in place. In some cases material 24 may be secured atop a panel that has subjacent pegs that fit into corresponding dog holes D.

Instead of loop pile carpeting, the penetrable or fibrous material 24 can be made with a fibrous sheet such as felt (about 6 mm thick, for example) or with a relatively thick fabric such as burlap. Alternatively, material 24 can be one or two layers of a relatively thin fabric such as linen. In some embodiments the penetrable material may be the loop fabric used in conventional hook and loop fasteners. In other cases the material 24 itself may be made of a penetrable material such as a sponge-like substance, clay, polystyrene foam, a soft plastic, an elastomer, etc. In still other embodiments the material 24 may have an external mesh or grid with sufficient underlying clearance to accept prongs, which prongs will be described presently. For example, the material 24 can be an open frame covered with metal screening much like the screening used in windows and doors.

While material 24 is shown covering only a portion of the topside of platform P, in some embodiments the material will cover all or substantially all of platform P. In other cases material 24 may be a fibrous panel (e.g., a plastic board covered with felt) placed in a recess such as recess R. In such a case the top of the material 24 will be approximately flush with the rest of the topside of platform P.

A workpiece W is shown in phantom lying on penetrable material 24 with its outer edge against one of the fixtures F. In this case the inside edge W1 of workpiece W is undulating, almost S-shaped. A pair of rectangular blocks 10 are positioned against the undulating edge W1 of workpiece W. Blocks 10 and top 24 are considered part of a holding system.

It will be appreciated that depending upon the size and shape of the workpiece W a different number of blocks 10 may be employed. As described further hereinafter, blocks 10 can be finely positioned along penetrable material 24. Accordingly, the blocks will each have one of its faces positioned tangentially at two spaced positions along edge W1. Thus, these working faces of blocks 10 engaging workpiece W need not be parallel to the opposing faces of fixtures F.

While illustrated herein with a cubic shape, block 10 can have another multi-faceted parallelepiped or polyhedral shape, arranged to have maximum symmetry, little symmetry or no symmetry. In other embodiments the block may have curved faces, e.g., a cylinder, a sphere, an ovoid, a paraboloid, a cone, a surface of revolution, a section of one of the foregoing, or some other arbitrary shape.

Blocks 10 have on their underside (connecting face) a connector. Tab 20A of such a connector is visible in this view. As will be explained presently, these connectors can be used to releasably attach blocks 10 to material 24.

Figure 2:
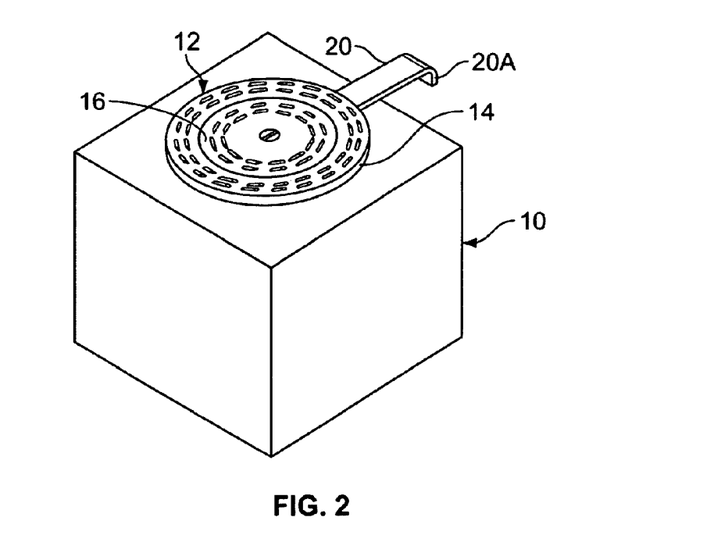
FIG. 2 is a perspective view of one of the blocks of FIG. 1.
Figure 3:
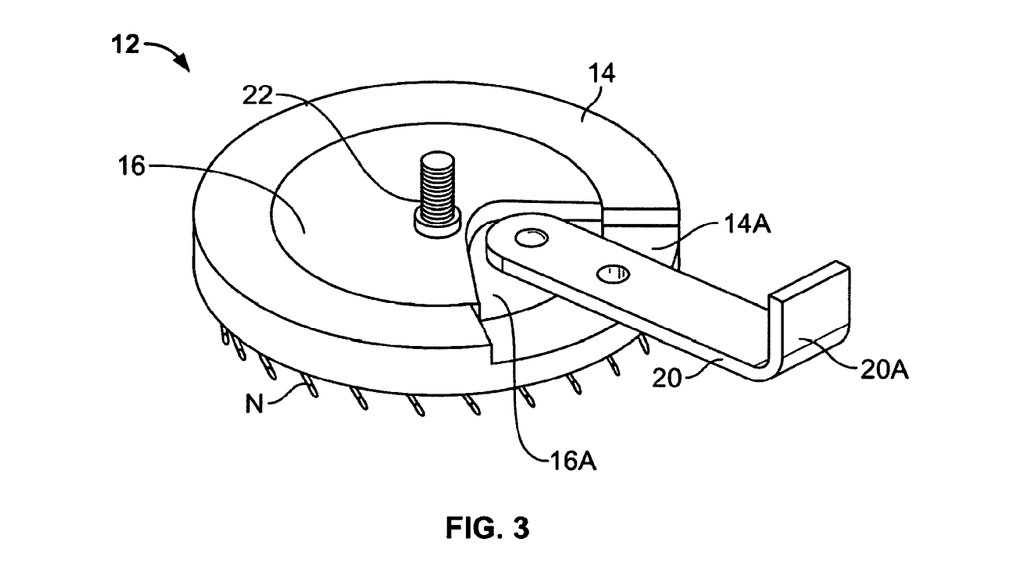
FIG. 3 is a perspective view of the connector on the block of FIG. 2.
Figure 4:
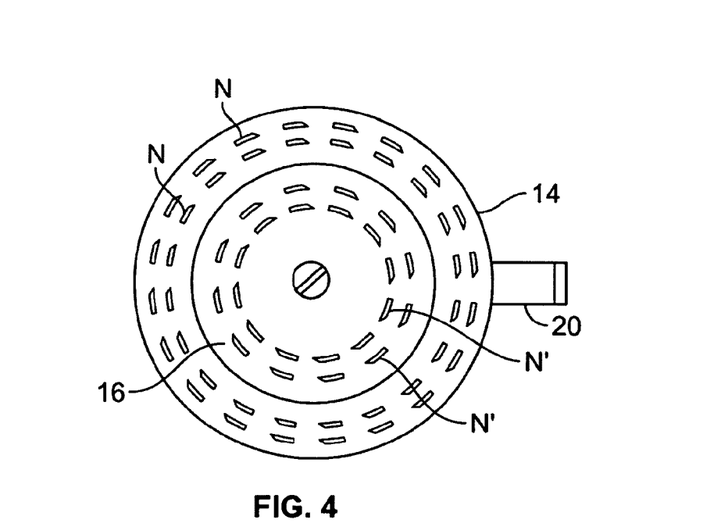
FIG. 4 is a plan view of the outside of the connector of FIG. 3.

Referring to FIGS. 2-4, connector 12 is the previously mentioned connector on block 10. Connector 12 has a central first hub 16 encircled by an annular, second hub 14. Annular hub 14 may have essentially cylindrical inside and outside circumferences, while hub 16 may be essentially a cylinder with a circular outline. Alternatively, the interfacing surfaces of hubs 14 and 16 may be joined by an annular bead that snaps into an annular groove. Hubs 14 and 16 may be made from plastic, metal, ceramic, wood, or other materials.

Hub 14 has a pair of radially aligned steps that descend onto opposite ends of recess 14A. Hub 16 has a wedge-shaped recess 16A having approximately the same angular compass as recess 14A. Recesses 14A and 16A provide clearance for manually operable link 20, shown as a flat blade with straight edges, a rounded proximal end, and a distal end with transverse tab 20A.

Link 20 is pivotally connected at its proximal end to hub 16 near the inside corner of recess 16A. Link 20 is also pivotally connected to hub 14 at the center of recess 14A. Link 20 extends to the outside of hub 14 and by manipulating its distal tab 20A can act as a manually operable lever. Using hub 16 as a frame of reference, if link 20 is rotated clockwise (counterclockwise) hub 14 will rotate clockwise (counterclockwise).

In most embodiments hubs 14 and 16 will both counterrotate concentrically and relative to object 10. Accordingly, threaded axle 22 extends along the axis of hub 16 and may be threaded into a bearing (not shown) in the connecting face of block 10. Alternatively, axle 22 may be threaded into block 10 to an adjustable depth to adjust the height of block 10 from the platform (platform P of FIG. 1). In any event, hub 16 will still be able to rotate relative to block 10.

Referring to FIG. 4, hubs 14 and 16 have a plurality of spiral prongs N and N', respectively. Prongs N are arranged in two circular concentric rows of twenty prongs each, that is, forty altogether on hub 14. Prongs N' are arranged in two circular concentric rows of twelve prongs each, that is, twenty-four altogether on hub 16. Prongs N' are shaped and distributed in the same way, except for being a mirror image of the arrangement of prongs N. Thus prongs N spiral in the opposite direction of prongs N', thereby providing left and right hand threads.

Figure 5:
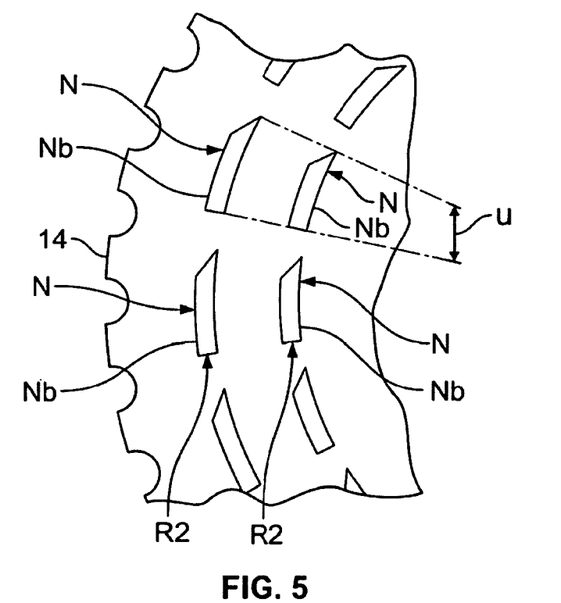
FIG. 5 is a fragmentary, bottom view of one of the hubs and prongs of FIG. 3.
Figure 6:
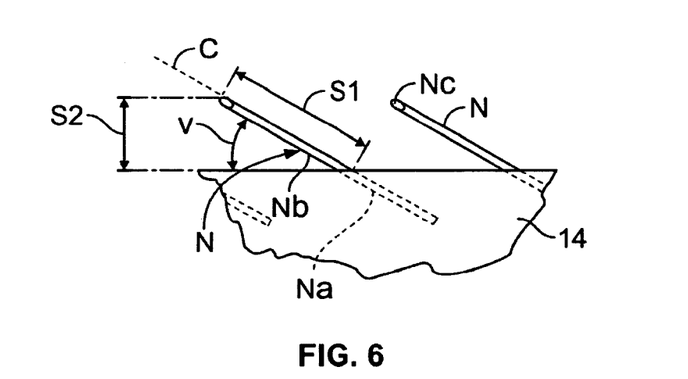
FIG. 6 is a fragmentary side view of the hub and prongs of FIG. 5.

Referring to FIGS. 5 and 6, prongs N are shown arranged into concentric circular rows identified as an outside row R1 and an inside row R2. A portion of the outside row is illustrated by itself in FIG. 6. Each prong N has a portion Na embedded in hub 14 to support an exposed portion Nb having an overall exposed length s1. Portion Na may be embedded by being molded in place. While distinct embedded prongs are illustrated, in some embodiments the prong will be a feature molded upon the face of the hub.

In this embodiment prongs N have a circular cross-section and their distal tips may be sharpened by being ground at an angle to produce an elliptical feature Nc. However, different cross-sections are contemplated and sharpening is optional.

Embedded prong portion Na is straight and lies in an upright reference plane that is parallel to the axis of hub 14 and tangent to the circle defining the prong row (in FIG. 6 row R1). This point of tangency is defined at the transition between portion Na and portion Nb. Both portions Na and Nb lie in a canted plane C that is perpendicular to the reference plane. This canted plane C intersects the axis and the surface of hub 14 at angle v, which defines the angle of elevation of prong N.

The exposed portion Nb of prong N is shown curved in FIG. 5, which is a plan view and therefore essentially a projection of prongs N onto the surface of hub 14. Prongs N are shown there following circular paths associated with their respective rows R1 and R2; although strictly speaking, to project onto a circle, prong portion Nb would follow an elliptical path in canted plane C. While exposed portion Nb can follow such an elliptical path to project the ideal circular path, as a practical matter there is almost no significant difference between bending the portion Nb into this elliptical path or approximating the elliptical path with a circular bend. This follows from the fact that prong portion Nb follows a relatively small turning arc u of about 15°. In particular, since there are twenty prongs N per row, the prong to prong spacing is 18°.

Figure 7:
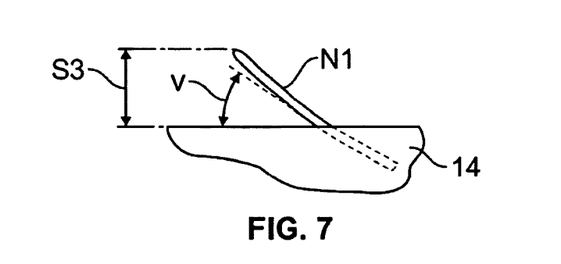
FIG. 7 is a fragmentary side view of a hub and prongs that is an alternate to that of FIG. 6.

Ideally, the exposed portions of the prongs will follow a helical path and therefore will not lie on a plane. FIG. 7 shows a prong N1 whose exposed portion follows such a helical path. A line tangent to such a path can be set to have the same angle of elevation v as before, but, being helical, the path will rise faster and reach a greater height s3 for the same turning arc.

Referring again to FIG. 6, prongs N should be thin enough and long enough to pierce and efficiently anchor to the target material. If the prongs are too thin they will tend to bend or break and will not effectively penetrate the target material and stay anchored thereto. Also, if the prongs are too long, they may require rotation through a greater angle, which will tend to slow the speed of penetration and increase the torque needed to penetrate. In addition, the angle of elevation v of prongs N should be steep enough to ensure that the prongs penetrate to a sufficient depth without skimming over the surface of the target material. On the other hand, an excessively steep angle of penetration will provide insufficient anchoring strength and the prongs will tend to slip out of the target material.

For prongs intended to anchor onto loop pile carpeting (e.g., carpet pile 3 mm deep with 4 mm loop circumference) an exposed prong length s1 of 0.25 to 0.35 inch (6.4 to 8.9 mm) at an angle of elevation of 30°±10° works satisfactorily. For the embodiment of FIG. 6 prong N will have a nominal rise s2 of 0.15 inch (3.8 mm). For the embodiment of FIG. 7 rise s3 will be nominally 0.19 inch (4.8 mm). For effective anchoring, the exposed length s1 will exceed the rise (rise s2 in FIG. 6 and rise s3 in FIG. 7). In one embodiment prongs N were made of steel piano wire, 0.033 inch (0.84 mm) in diameter.

It will be understood that the foregoing dimensions and materials can be varied depending upon the target material, desired anchoring strength, desired angle of rotation, strength of the prongs, etc. For penetrable material thinner than ordinary loop pile carpeting, prongs N and N' will typically be scaled down in proportion to the reduced thickness of the penetrable material. In general, the length, number, spacing, angle of elevation and other characteristics of prongs N and N' may be altered to accommodate different penetrable materials.

Also, if the prong-bearing hub will have a greater diameter, the number of prongs per row can be scaled up appropriately while keeping approximately the same prong length. So if, for example, the hub diameter is doubled in comparison to the foregoing embodiment, the number of prongs will be doubled as well for the same prong length.

In any event, by rotating lever 20 counterclockwise (FIG. 3), prongs N and N' (FIG. 3) counter-rotate with hubs 14 and 16, respectively. Being helical, or approximately helical, prongs N and N' screw and anchor into the penetrable material 24 of FIG. 1.

In this embodiment hubs 14 and 16 rotate 15° or less, i.e. no more than the angle u of FIG. 5. Here the angle of rotation is no more than one-twenty fourth of a turn. To make an anchor quick-acting it is advantageous to have the angle of rotation at most one-sixteenth of a turn. It will be appreciated that the relative rotation between hubs 14 and 16 will be additive, that is, 30° or less. However as a practical matter, the relative rotation need not reach its full potential angular displacement to achieve satisfactory anchoring. In any event, prongs N and N' of the two hubs spiral into substrate 24 of FIG. 4 and lock in place.

With blocks 10 now locked into position as shown in FIG. 1, a user may now turn handle H to drive movable jaw element V2 inwardly. Consequently, fixture F will drive the workpiece W against the two blocks 10. Because blocks 10 are positioned to accurately mate with curved edge W1 of workpiece W, the workpiece is securely held in position. Thereafter, workpiece W may be drilled, abraded, planed, or otherwise machined or finished.

To release workpiece W handle H is used to turn screw J in a direction to move jaw V2 outwardly. Next, connectors 12 may be released by pushing lever 20 in the reverse direction (clockwise in FIG. 3) to rotate hub 14 clockwise relative to hub 16. Consequently, prongs N and N' will unscrew. Blocks 10 can then be released for storage or for repositioning.

Figure 8:
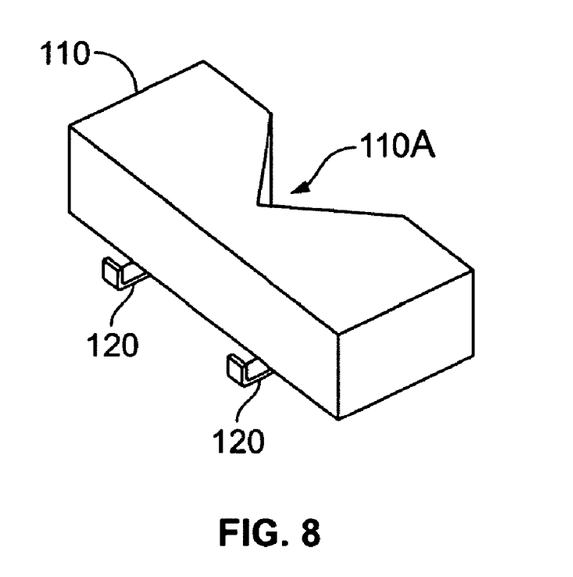
FIG. 8 is a perspective view of a block that is an alternate to that shown in FIG. 2.

Referring to FIG. 8, alternative block 110 is a rectangular parallelepiped having a V-shaped notch 110A, which may be used to engage a rounded feature of a workpiece. Also, since its faces are perpendicular, notch 110A may receive the square corner of a workpiece. While the face of block 110 having notch 110A may be used as a working face, in some cases one of the smaller, adjacent, upright faces of block 110 may be used as a working face instead.

In this embodiment, the underlying connecting face of block 110 has a pair of connectors, only their operating levers 120 being visible in this view. These connectors are identical to connector 12 of FIG. 3. Having double connectors, block 110 is able to provide twice as much clamping force as the block of FIG. 2. Block 110 may be used in a manner similar to that previously described for block 10 of FIG. 1.

Figure 9:
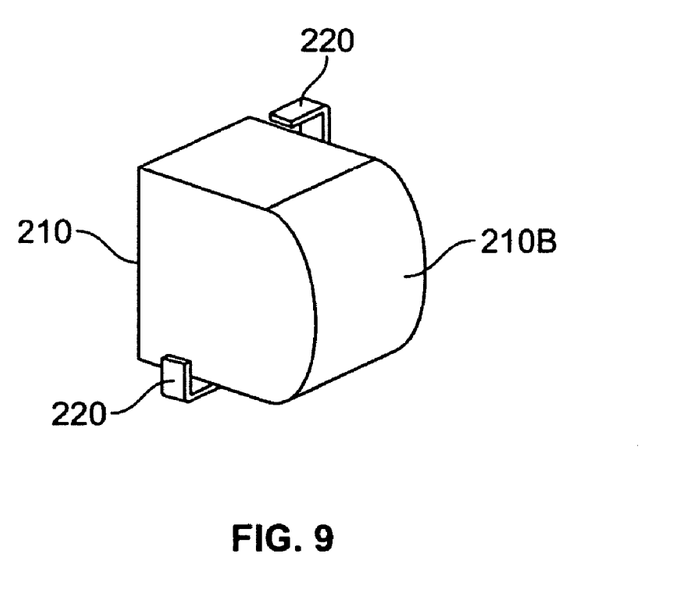
FIG. 9 is an perspective view of a block that is an alternate to that shown in FIGS. 2 and 8.

Referring to FIG. 9, alternative block 210 is a rectangular parallelepiped except for a cylindrically curved working face 210B. From the perspective of FIG. 9 the two faces adjacent to the lower edge and right edge of working face 210B have a connector (only their operating levers 220 being visible in this view). These two connectors are identical to connector 12 of FIG. 3. Either one of these two connector-bearing faces may be referred to as a connecting face, in which case the other one will be referred to as an auxiliary face.

Either of the connectors of block 210 may be used to attach the block to material 24 of FIG. 1. Because either of the connectors may be employed, the axis of curvature of face 210B may be either horizontal or vertical depending upon the choice of connector. Again, block 210 may be used in a manner similar to that previously described for block 10 of FIG. 1.

Obviously, many modifications and variations of the present invention are possible in light of the above teachings. It is therefore to be understood that within the scope of the appended claims, the invention may be practiced otherwise than as specifically described.

The invention claimed is:

1. A holding system for a workbench equipped with a clamping device having a moveable element for applying clamping force to a workpiece, comprising:
   a top adapted to be disposed upon said workbench proximate said clamping device, said top including a fibrous or pierceable material; and
   at least one block having a working face and a connecting face, said at least one block being adapted to be placed on said top adjacent the workpiece with said working face being orientable in a direction toward said moveable element in order to receive clamping force applied to said workpiece by said moveable element, said block having on its connecting face at least one connector for securing said block in place on said top against clamping forces from said clamping device, said connector including:
   a first hub and a second hub rotatably mounted on said connecting face, each of said hubs having on one side thereof a plurality of spiral prongs, the spiral prongs on said first hub spiraling in a direction opposite that of the spiral prongs on said second hub; and
   a manually operable link connected between said first and said second hub for applying to them a reversible torque for relatively rotating them in opposite directions and causing the spiral prongs of the first hub and the second hub to reversibly penetrate said fibrous or pierceable material of said top in opposite directions, one penetrating clockwise and the other penetrating counterclockwise, in order to reversibly connect to said fibrous or pierceable material of said top and avoid movement of said at least one block over said top in response to clamping force from said moveable element.

2. A holding system according to claim 1 wherein said second hub is annular and said first hub is rotatably mounted within said second hub.

3. A holding system according to claim 2 wherein said first hub has a circular outline and is concentrically mounted in said second hub.

4. A holding system according to claim 1 wherein said first hub is rotatably attached to the connecting face of the at least one block.

5. A holding system according to claim 1 wherein said working face and said connecting face are two of a plurality of differently oriented facets of said block, said plurality of facets including an auxiliary face, said at least one connector being two in number with one being mounted on said connecting face and the other one being mounted on said auxiliary face.

6. A holding system according to claim 1 wherein said at least one block is cubic.

7. A holding system according to claim 1 wherein said at least one block is at least two in number, the blocks each having said connector that is adapted to be attached to the top.

8. A holding system according to claim 1 wherein said link is a lever pivotally attached to said first and said second hub and extending outside them.

9. A holding system according to claim 8 wherein said first hub is rotatably attached to the connecting face of the block.

10. A holding system according to claim 1 wherein on each of said hubs said spiral prongs are arranged in at least one circular row.

11. A holding system according to claim 10 wherein said plurality of spiral prongs on said first and said second hub are oppositely threaded, one having a left hand thread, the other a right hand thread.

12. A holding system according to claim 1 wherein said link is operable to turn said first and said second hub relative to each other at most 1/16 of a turn.

13. A holding system according to claim 12 wherein each of said spiral prongs rises less than its overall exposed length.

14. A holding system according to claim 1 wherein said top comprises a fibrous sheet secured atop the workbench.

15. A holding system according to claim 1 wherein said top comprises a fibrous panel adapted to be secured in a recess in the workbench.

16. A holding system according to claim 1 wherein said fibrous or pierceable material partially covers said workbench.

17. A clamping method applying one or more blocks having an underlying connector to a workbench equipped with a fibrous or pierceable material on top as well as being equipped with a clamping device having a moveable element, the connector including concentrically nested hubs with oppositely spiraling prongs, the method comprising the steps of:
   placing the connector of the block on the fibrous or pierceable material;
   counter-rotating the hubs in the connector to embed their spiral prongs in the fibrous or pierceable material atop said workbench by causing the spiraling prongs of the hubs to penetrate said fibrous or pierceable material of said top in opposite directions, one penetrating clockwise and the other penetrating counterclockwise;
   placing a workpiece between said block and the moveable element; and
   operating the clamping device to press the moveable element against the workpiece to, in turn, press the workpiece against the block, in order to clamp the workpiece between the moveable element and the block.

18. A method according to claim 17 wherein the step of counter-rotating the hubs is performed by relatively rotating the hubs at most 1/16 of a turn.

19. A method according to claim 17 wherein the one or more blocks comprise a plurality of blocks, the step of adjoining the connector being repeated for each of the plurality of the blocks, said blocks being arranged along an edge of the workpiece with a spacing continuously adjusted to match the dimensioning of the workpiece.

20. A workbench comprising:
   a frame with a platform;
   a clamping device mounted to said frame and having a moveable element for applying a clamping force to a workpiece;
   a top mounted on said platform proximate said clamping device, said top including a fibrous or pierceable material at least partially covering said platform; and
   a plurality of blocks each having a working face and a connecting face, said working face being orientable in a direction toward said moveable element in order to receive clamping force applied to said workpiece by said moveable element, said blocks each having on its connecting face at least one connector for securing said plurality of blocks in place on said top against clamping forces from said clamping device, for at least one of said blocks the at least one connector being two in number and both mounted on the at least one of said blocks with one being mounted on said connecting face and the other being spaced from said connecting face, said connector including:
   a first hub and a second hub rotatably mounted on the corresponding one of said blocks, said first hub being rotatably mounted to the connecting face of the corresponding one of the blocks, said second hub being annular, said first hub having a circular outline and being concentrically and rotatably mounted in said second hub, each of said hubs having on one side thereof a plurality of spiral prongs arranged in at least one circular row, the spiral prongs on said first hub spiraling in a direction opposite that of the spiral prongs on said second hub to provide a right and a left hand thread, each of said spiral prongs rising less than its overall exposed length; and
   a manually operable lever connected between said first and said second hub and extending outside them for applying to them a reversible torque for relatively rotating them in opposite directions at most 1/16 of a turn in order to reversibly connect to said fibrous or pierceable material of said top and avoid movement in response to said clamping force by causing the spiral prongs of the hubs to penetrate said fibrous or pierceable material of said top in opposite directions, one penetrating clockwise and the other penetrating counterclockwise.

* * * * *